US010409913B2

(12) United States Patent
Bhatt et al.

(10) Patent No.: US 10,409,913 B2
(45) Date of Patent: Sep. 10, 2019

(54) METHODS AND SYSTEMS TO TRAIN CLASSIFICATION MODELS TO CLASSIFY CONVERSATIONS

(71) Applicant: Conduent Business Services, LLC, Florham Park, NJ (US)

(72) Inventors: Himanshu Sharad Bhatt, New Delhi (IN); Shourya Roy, Bangalore (IN); Tanmoy Patra, Kolkata (IN)

(73) Assignee: Conduent Business Services, LLC, Florham Park, NJ (US)

( * ) Notice: Subject to any disclaimer, the term of this patent is extended or adjusted under 35 U.S.C. 154(b) by 16 days.

(21) Appl. No.: 14/872,258

(22) Filed: Oct. 1, 2015

(65) Prior Publication Data
US 2017/0098443 A1 Apr. 6, 2017

(51) Int. Cl.
*G06F 17/27* (2006.01)
*G10L 15/26* (2006.01)
*G06F 16/35* (2019.01)

(52) U.S. Cl.
CPC .......... *G06F 17/2785* (2013.01); *G06F 16/35* (2019.01); *G10L 15/26* (2013.01)

(58) Field of Classification Search
CPC ...... G06F 17/279; G06F 17/28; G06F 16/951; G06F 16/285; G06F 17/2785
See application file for complete search history.

(56) References Cited

U.S. PATENT DOCUMENTS

| 6,199,034 B1* | 3/2001 | Wical ................. G06F 17/2785 704/9 |
| 6,954,755 B2 | 10/2005 | Reisman | |
| 7,509,572 B1* | 3/2009 | Melander ............ G06F 17/2247 704/9 |
| 8,204,751 B1* | 6/2012 | Di Fabbrizio ........ G06F 17/271 704/256 |
| 8,332,334 B2 | 12/2012 | Long et al. | |
| 8,543,563 B1 | 9/2013 | Nikoulina et al. | |
| 2005/0105712 A1* | 5/2005 | Williams .............. G10L 13/027 379/265.02 |

(Continued)

OTHER PUBLICATIONS

U.S. Appl. No. 14/477,215, filed Sep. 4, 2014; Domain Adaptation for Image Classification With Class Priors; Chidlovskii et al.

(Continued)

*Primary Examiner* — Matthew H Baker
(74) *Attorney, Agent, or Firm* — Jones Robb, PLLC

(57) ABSTRACT

Methods and systems for training a conversation-classification model are disclosed. A first set of conversations in a source domain and a second set of conversation in a target domain are received. Each of the first set of conversations has an associated predetermined tag. One or more features are extracted from the first set of conversations and from the second set of conversations. Based on the similarity of content in the first set of conversations and the second set of conversations, a first weight is assigned to each conversation of the first set of conversations. Further, a second weight is assigned to the one or more features of the first set of conversations based on the similarity of the one or more features of the first set of conversations and of the second set of conversations. A conversation-classification model is trained based on the first weight and the second weight.

16 Claims, 3 Drawing Sheets

(56) References Cited

U.S. PATENT DOCUMENTS

| | | | |
|---|---|---|---|
| 2007/0073533 A1* | 3/2007 | Thione | G06F 17/279 704/9 |
| 2008/0300856 A1* | 12/2008 | Kirk | B07C 3/00 704/4 |
| 2010/0179803 A1 | 7/2010 | Sawaf et al. | |
| 2011/0035210 A1 | 2/2011 | Rosenfeld et al. | |
| 2011/0238408 A1* | 9/2011 | Larcheveque | G06F 17/2785 704/9 |
| 2012/0284791 A1 | 11/2012 | Miller et al. | |
| 2013/0339021 A1* | 12/2013 | Deshmukh | G10L 15/18 704/257 |
| 2014/0067361 A1 | 3/2014 | Nikoulina et al. | |
| 2014/0163951 A1 | 6/2014 | Nikoulina et al. | |
| 2014/0200878 A1 | 7/2014 | Mylonakis et al. | |
| 2014/0280621 A1 | 9/2014 | Bourdaillet et al. | |
| 2015/0032443 A1* | 1/2015 | Karov | G06F 17/2785 704/9 |
| 2015/0178371 A1* | 6/2015 | Seth | H04L 67/10 707/748 |
| 2015/0326710 A1* | 11/2015 | Amerling | H04M 3/38 379/243 |
| 2016/0283463 A1* | 9/2016 | M R | G06F 17/2705 |
| 2018/0373696 A1* | 12/2018 | Terry | G06N 20/00 |

OTHER PUBLICATIONS

S. J. Pan and Q. Yang, A Survey on Transfer Learning. IEEE Transactions on Knowledge and Data Engineering, pp. 1345-1359(22), 2010.

Charles Sutton, Andrew McCallum, An Introduction to Conditional Random Fields, Machine Learning, 2010.

J. D. Lafferty, A. McCallum and F. C. N. Pereira, Conditional Random Fields: Probabilistic Models for Segmenting and Labeling Sequence Data. In Proceedings of International Conference on Machine Learning, pp. 282-289, 2001.

S. Satpal and S. Sarawagi, Domain Adaptation of Conditional Probability Models Via Feature Subsetting. In Proceedings of the European conference on Principles and Practice of Knowledge Discovery in Databases, pp. 224-235, 2007.

J. Jiang and C. Zhai, Instance weighting for domain adaptation in NLP, In Proceedings of Association for Computational Linguistics, pp., 2007.

* cited by examiner

US 10,409,913 B2

METHODS AND SYSTEMS TO TRAIN CLASSIFICATION MODELS TO CLASSIFY CONVERSATIONS

TECHNICAL FIELD

The presently disclosed embodiments are related, in general, to a classifier. More particularly, the presently disclosed embodiments are related to the methods and systems for training a classifier to classify conversations.

BACKGROUND

A classifier may correspond to a model that may have a capability to categorize data into one or more categories. The categorized data may be used to predict a predetermined outcome, which may allow organizations to take necessary steps based on the predicted outcome.

Usually, the classifier may be trained using training data. The training data may correspond to a domain in which the classifier needs to be trained. For example, if the classifier is to be trained to classify financial conversations, the training data (used to train the classifier) may be from the financial domain. Therefore, if there is a need to classify conversations from domains other than the financial domain, the classifier (trained to classify financial conversations) may not work accurately.

SUMMARY

According to the embodiments illustrated herein, there is provided a method for training a conversation classification model. The method includes receiving, by a transceiver, a first set of conversations corresponding to a source domain and a second set of conversations corresponding to a target domain, each conversation in the first set of conversations has an associated predetermined tag, and wherein each conversation in the first set of conversations and the second set of conversations corresponds to an audio conversation. The method further includes generating, by one or more processors, a transcript for each conversation in the first set of conversations and the second set of conversations based on a speech to text conversion technique. The method further includes extracting, by one or more processors, one or more features from the transcript of each of the first set of conversations and the second set of conversations. The method further includes assigning, by the one or more processors, a first weight to each conversation in the first set of conversations based on at least a similarity between content of the first set of conversations and content of the second set of conversations, wherein the similarity of the content is determined based on the one or more features. The method further includes assigning, by the one or more processors, a second weight to each of the one or more features associated the first set of conversations based on the similarity between the one or more features extracted from the transcript of the first set of conversations and the one or more features extracted from the transcript of the second set of conversations. The method further includes training, by the one or more processors, the conversation classification model based on at least the first weight and the second weight, wherein the conversation classification model is capable of assigning the predetermined tag to the second set of conversations.

According to the embodiments illustrated herein, there is provided for training a conversation classification model. The system includes a transceiver configured to receive a first set of conversations corresponding to a source domain and a second set of conversations corresponding to a target domain, wherein each conversation in the first set of conversations has an associated predetermined tag, and wherein each conversation in the first set of conversations and the second set of conversations corresponds to an audio conversation. The system further includes one or more processors configured to generate, by one or more processors, a transcript for each conversation in the first set of conversations and the second set of conversations based on a speech to text conversion technique. The one or more processors are further configured to extract one or more features from the transcript each of the first set of conversations and the second set of conversations. The one or more processors are further configured to assign a first weight to each conversation in the first set of conversations based on at least a similarity between content of the first set of conversations and content of the second set of conversations. The one or more processors are further configured to assign a second weight to each of the one or more features associated the first set of conversations based on the similarity between the one or more features extracted from the transcript of the first set of conversations and said one or more features extracted from the transcript of the second set of conversations. The one or more processors are further configured to train the conversation classification model based on at least the first weight and the second weight, wherein the conversation classification model is capable of assigning the predetermined tag to the second set of conversations.

According to the embodiments illustrated herein, there is provided a computer program product for use with a computing device. The computer program product comprises a non-transitory computer readable medium storing a computer program code for training a conversation classification model. The computer program code is executable by one or more processors in the computing device to receive a first set of conversations corresponding to a source domain and a second set of conversations corresponding to a target domain, wherein each conversation in the first set of conversations has an associated predetermined tag, and wherein each conversation in the first set of conversations and the second set of conversations corresponds to an audio conversation. The computer program code is further executable by the one or more processors to, generate, by one or more processors, a transcript for each conversation in the first set of conversations and the second set of conversations based on a speech to text conversion technique. The computer program code is further executable by the one or more processors to extract one or more features from the transcript each of the first set of conversations and the second set of conversations. The computer program code is further executable by the one or more processors to assign a first weight to each conversation in the first set of conversations based on at least a similarity between content of the first set of conversations and content of the second set of conversations, wherein the similarity of the content is determined based on the one or more features. The computer program code is further executable by the one or more processors to assign a second weight to each of the one or more features associated with the first set of conversations based on the similarity between the one or more features extracted from the transcript of the first set of conversations and the one or more features extracted from the transcript of the second set of conversations. The computer program code is further executable by the one or more processors to train the conversation classification model based on at least the first weight and the second weight, wherein the conversation classification model is capable of assigning the predetermined tag to the second set of conversations.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
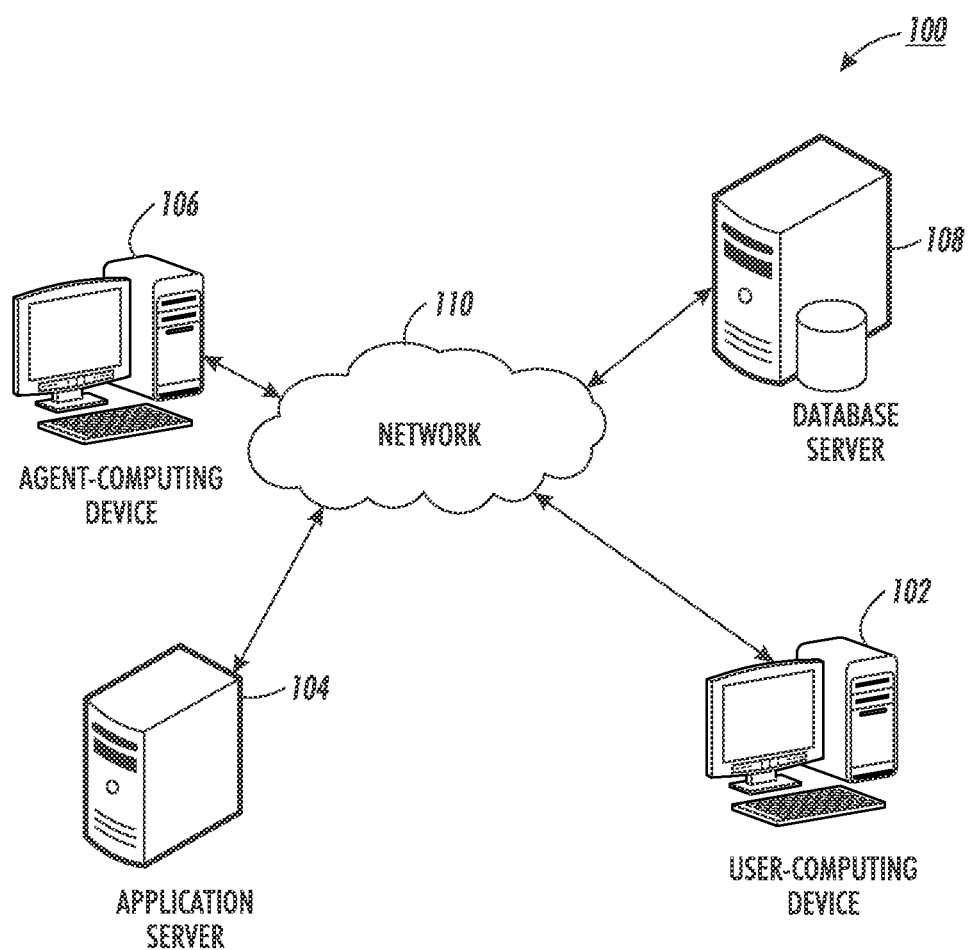
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions

The following terms shall have, for the purposes of this application, the respective meanings set forth below.

A "conversation" refers to one or more dialogues exchanged between a first person and a second person. In accordance with an embodiment, the first person may correspond to an agent (in a customer care environment), and the second person may correspond to a customer. In accordance with an embodiment, the conversation may correspond to either an audio conversation or a textual conversation between the two users over a communication medium. In accordance with an embodiment, the conversation may correspond to a domain. Examples of the domain may include, but are not limited to, a financial domain, a medical domain, and a technical domain.

A "classifier" refers to a mathematical model that may be configured to classify a set of conversations in one or more categories based on the content of the set of conversations. In another embodiment, the classifier may assign predetermined tags to each conversation in the set of conversations based on the content of the set of conversations. Examples of the classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier.

"Training" refers to a process of updating/tuning a classifier using at least a historical data such that the classifier may be able to assign at least a tag, from one or more predetermined tags, to the set of conversations. In an embodiment, the one or more predetermined tags may correspond to a status of the set of conversations. Examples of the one or more predetermined tags include, but are not limited to, open, closed, solved, and change channel.

An "agent" refers to a customer representative who may have the skills to solve problems/trouble faced by the customer. In an embodiment, the agent may further correspond to a sales representative who may offer products or services to the customer. In an embodiment, the agent may troubleshoot or may offer products or services to the customer through a conversation. In an embodiment, the agent(s) includes, but is not limited to, a customer care executive, a customer helpline employee, or an employee responsible to respond to feedback provided by customers on various online forums.

A "domain" may correspond to a technical or business field to which a conversation is related. In an embodiment, the domain may correspond to a source domain or a target domain. In an embodiment, the source domain may correspond to a domain for which a classifier is trained, based on a first set of conversations. In an embodiment, the target domain corresponds to a domain in which the classifier is trained, based on the second set of conversations.

"One or more features" refers to one or more identifiers in the content of the conversations, which may be used by the classifier to assign the one or more predetermined tags. In an embodiment, the one or more features may include, but are not limited to, a count of n-gram words in a conversation, a position of a segment in a thread of a conversation, a position of a segment in a conversation, a sender of a conversation, an email of a sender, a count of letters in uppercase, a count of punctuations in a conversation, a measure of positive sentiment, and a measure of a negative sentiment.

FIG. 1 is a block diagram of a system environment 100, in which various embodiments can be implemented. The system environment 100 includes, one or more user-computing devices 102, an application server 104, one or more agent-computing devices 106, a database server 108, and a network 110. Various devices in the system environment 100 (e.g., the one or more user-computing devices 102, the application server 104, the one or more agent-computing devices 106 and the database server 108) may be interconnected over the network 110.

The one or more user-computing devices 102 refer to computing devices that are associated with the one or more users. In an embodiment, the one or more user-computing device 102 may be communicatively coupled to the network 110. The one or more users may utilize the one or more user-computing devices 102 to initiate a conversation with the one or more agents associated with the one or more agent-computing devices 106. The user-computing device 102 may be operable to execute one or more sets of instructions stored in one or more memories of the user-computing devices 102 to initiate and manage the conversation with the one or more agent-computing devices 106. In an embodiment, the conversation between the user and the agent may correspond to an audio conversation or a textual conversation. The user-computing device 102 may correspond to a variety of computing devices such as a desktop, a computer server, a laptop, a personal digital assistant (PDA), a tablet computer, and the like.

The application server 104 refers to a computing device that is configured to host a conversation-classifying model. The conversation-classifying model is configured to assign one or more predetermined tags to a conversation based on the content of the conversation. In an embodiment, the application server 104 may be configured to train the conversation-classifying model using a first set of conversations in a source domain and a second set of conversations in a target domain. In an embodiment, each conversation of the first set of conversations may have an associated predetermined tag. Further, each conversation in the second set of conversations does not have an associated predetermined tag. In an embodiment, the application server 104 may retrieve the first set of conversations and the second set of conversations from the database server 108.

In an embodiment, the application server 104 may extract one or more features from each of the one or more conversations of the first set of conversations. In an embodiment, the application server 104 may extract the one or more features from each of the one or more conversations of the second set of conversations. In an embodiment, the one or more features may correspond to a count of n-gram words in a conversation, a position of a segment in a thread of a conversation, a position of a segment in a conversation, a sender of a conversation, an email of a sender, a count of letters in uppercase, a count of punctuations in a conversation, a measure of positive sentiment in a conversation, and a measure of a negative sentiment in a conversation.

In an embodiment, the application server 104 may assign a first weight to each of the first set of conversations based on a similarity of content between the first set of conversations and the second set of conversations.

In an embodiment, the application server 104 may identify one or more conversations in the first set of conversations based on the determined similarity of content in the first set of conversations and the second set of conversations. In an embodiment, the one or more conversations may have a higher first weight in comparison with the other conversations in the first set of conversations.

In an embodiment, the application server 104 may assign a second weight to the extracted one or more features of the first set of conversations based on the similarity between the one or more features of the first set of conversations and the one or more features of the second set of conversations. In an embodiment, the one or more second weights may be assigned such that a feature of the one or more features, which is similar in the first set of conversations and the second set of conversations, is assigned a higher value of second weight in comparison with the other feature of the one or more features.

In an embodiment, the application server 104 may train a conversation classification model to assign the one or more predetermined tags to the second set of conversations in the target domain. In an embodiment, the conversation classification model is trained based on the assigned the first weight and the second weight.

The application server 104 may be realized through various types of application servers such as, but not limited to, a Java application server, a .NET framework, and a Base4 application server.

The agent-computing device 106 refers to a computing device that is used by an agent. In an embodiment, the agent may correspond to a worker or an employee who may assist the user to troubleshoot a problem faced by a user. In an embodiment, the agent may further offer one or more products or services to the user. In an embodiment, the agent may receive a request for the conversation from the user-computing device 102 through the agent-computing device 106. The agent may communicate with the user through the agent-computing device 106. The agent-computing device 106 may be operable to execute one or more sets of instructions stored in one or more memories. In an embodiment, the agent-computing device 106 may be communicatively coupled over the network 110. The agent-computing device 106 may include a variety of computing devices such as a laptop, a personal digital assistant (PDA), a tablet computer, a smartphone, a phablet, and the like.

The database server 108 may refer to a computing device that may store the first set of conversations and the second set of conversations. Further, the database server 108 may store the one or more predetermined tags associated with each of the first set of conversations. In an embodiment, the database server 108 may receive a query from the application server 104 to retrieve the first set of conversations and the second set of conversations. For querying the database server 108, one or more querying languages may be utilized such as, but not limited to, SQL, QUEL, DMX, and so forth. Further, the database server 108 may be realized through various technologies such as, but not limited to, Microsoft® SQL server, Oracle, and My SQL. In an embodiment, the application server 104 may connect to the database server 108 using one or more protocols such as, but not limited to, the ODBC protocol and the JDBC protocol.

A person skilled in the art will understand that the scope of the disclosure should not be limited to the application server 104 or the database server 108 as a separate entity. In an embodiment, the functionalities of the database server 108 and the application server 104 may be combined into a single server, without limiting the scope of the disclosure.

The network 110 corresponds to a medium through which content and messages may flow between one or more of, but not limited to, the user-computing device 102, the application server 104, the agent-computing device 106, and/or the database server 108. Examples of the network 110 may include, but are not limited to, a Wireless Fidelity (Wi-Fi) network, a Wide Area Network (WAN), a Local Area Network (LAN), or a Metropolitan Area Network (MAN). Various devices such as the user-computing device 102, the application server 104, the agent-computing device 106, and/or the database server 108 may connect to the network 110 in accordance with various wired and wireless communication protocols such as the Transmission Control Protocol/Internet Protocol (TCP/IP), the User Datagram Protocol (UDP), and the 2G, 3G, or 4G communication protocols.

Figure 2:
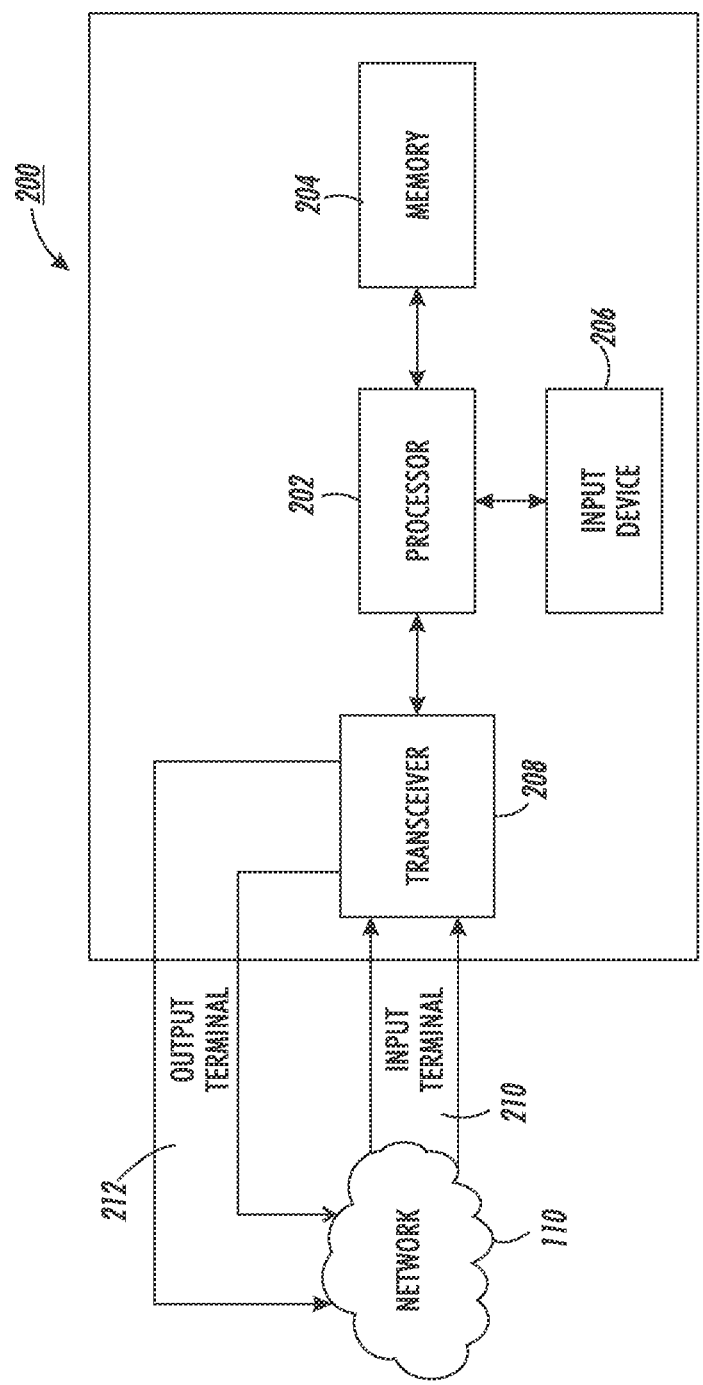
FIG. 2 is a block diagram illustrating a computing device for training a conversation classification model, in accordance with at least one embodiment.

FIG. 2 is a block diagram that illustrates a computing device 200 for training a conversation classification model, in accordance with at least one embodiment. For the purpose of the ongoing description, the computing device 200 is considered the application server 104. However, the scope of the disclosure should not be limited to the application server 104. The computing device 200 may also be realized as the user-computing device 102 or the agent-computing device 106.

The computing device 200 may include one or more processors, such as a processor 202, one or more memories, such as a memory 204, one or more input device 206, and one or more transceivers, such as a transceiver 208. The transceiver 208 may be coupled with an input terminal 210 and an output terminal 214. The transceiver 208 may be connected to the network 110 through the input terminal 210 and the output terminal 214. Further, the processor 202 may be coupled to the memory 204, the one or more input devices 206, or the transceiver 208.

The processor 202 may comprise suitable logic, circuitry, and/or interfaces that may be configured to execute one or more sets of instructions stored in the memory 204 to perform predetermined operations on the application server 104. The processor 202 may be implemented using one or more processor technologies known in the art. Examples of the processor 202 include, but are not limited to, an X86 processor, a RISC processor, an ASIC processor, a CISC processor, or any other microprocessor.

The memory 204 may comprise suitable logic, circuitry, and/or interfaces that may be configured to store one or more machine codes, and/or computer programs having at least one code section executable by the processor 202. The memory 204 may store the one or more sets of instructions that are executable by the processor 202 to perform the predetermined operation. It will be apparent to a person having ordinary skill in the art that the one or more instructions stored in the memory 204 may enable the hardware of the computing device 200 to perform the predetermined operation. In an embodiment, the memory 204 may include one or more buffers (not shown). The one or more buffers may store at least one or more of, but not limited to, the one or more predetermined tags of the first set of conversations and the second set of conversations. Some of the commonly known memory implementations include, but are not limited to, a random access memory (RAM), a read-only memory (ROM), a hard disk drive (HDD), and a secure digital (SD) card.

The input device 206 may comprise suitable logic, circuitry, interfaces, and/or code that may be configured to receive one or more inputs from a user pertaining to selection of a source domain and a target domain. The input device 206 may further be configured to communicate with the processor 202. Examples of the input devices may include, but are not limited to, a keyboard, a touch screen, a microphone, a camera, a motion sensor, a light sensor, and/or a docking station.

The transceiver 208 may comprise suitable logic, circuitry, and/or interfaces that may be operable to communicate with the one or more devices, such as the user-computing device 102, and/or one or more servers such as the application server 104 or the database server 108 over the network 110. The transceiver 208 may be operable to transmit or receive the instructions, queries, or other information to/from various components of the system environment 100. In an embodiment, the transceiver 208 is coupled with the input terminal 210 and the output terminal 214 through which the transceiver 208 may receive or transmit the first set of conversations and the second set of conversations. In an embodiment, the input terminal 210 and the output terminal 214 may be realized through, but are not limited to, an antenna, an Ethernet port, a USB port or any other port that can be configured to receive or transmit data. The transceiver 208 may receive or transmit various data in accordance with various communication protocols such as, TCP/IP, UDP; and 2G, 3G, or 4G communication protocols through the input terminal 210 and the output terminal 214, respectively. An embodiment of the operation of the computing device 200 for training a conversation classification model has been explained further in conjunction with FIG. 3.

Figure 3:
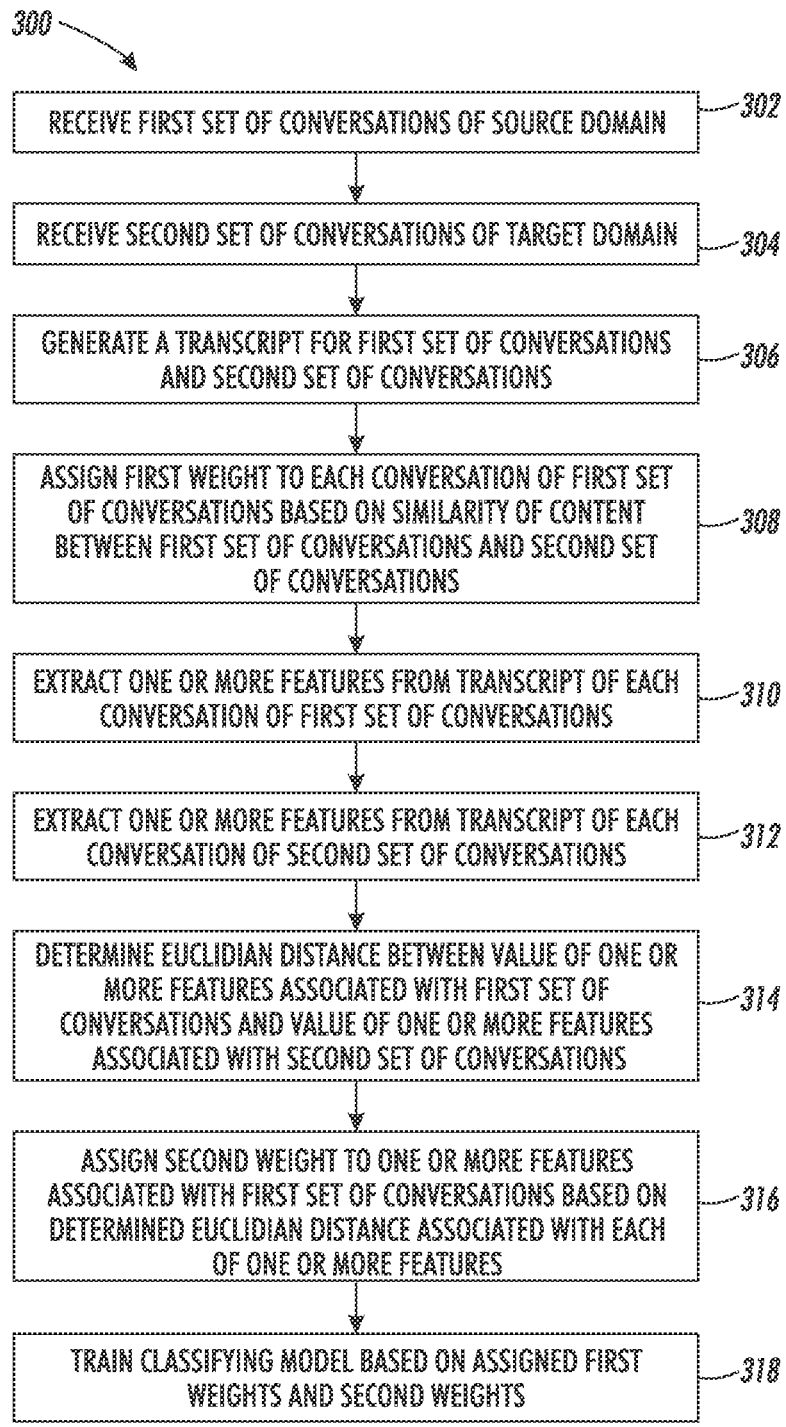
FIG. 3 is a flowchart illustrating a method of training a conversation classification model, in accordance with at least one embodiment.

FIG. 3 is a flowchart 300 illustrating a method of training a conversation classification model, in accordance with at least one embodiment. The flowchart 300 is described in conjunction with FIG. 1 and FIG. 2.

At step 302, the first set of conversations may be received. In an embodiment, the processor 202 may receive the first set of conversations from the database server 108 through the transceiver 208. Before receiving the first set of conversations, in an embodiment, the processor 202 may transmit a query to the database server 108 to retrieve the first set of conversations. Thereafter, the processor 202 may receive the first set of conversations from the database server 108.

In an embodiment, each conversation in the first set of conversations may correspond to one or more dialogue-exchange between an agent and a customer. Further, each conversation in the first set of conversations may correspond to a source domain. In an embodiment, the source domain may correspond to a technical or a financial domain to which each conversation in the first set of conversations is related. For example, if the agent and the customer are having a conversation related to network issues faced by the customer, the domain of the conversation may correspond to a technical domain (or more specifically, a telecom domain).

In an embodiment, each conversation in the first set of conversations has an associated predetermined tag from the one or more predetermined tags. In an embodiment, the one or more predetermined tags may correspond to at least a status of the conversation. In an embodiment, the following table illustrates examples of the one or more predetermined tags:

TABLE 1

Predetermined tags and corresponding descriptions

| Predetermined tags | Description |
| --- | --- |
| Open | When a conversation is ongoing and a further message is expected |
| Solved | When the current message solves the problem mentioned in the current conversation, without requiring any further message |
| Closed | When the current message closes the conversation, even if the problem is not solved |
| Change channel | When a CRM agent asks a customer to change the channel by sending an email or a direct message. In this case, the conversation halts as further exchanges are on other private channels |

For example, if a conversation in the first set of conversations has an associated predetermined tag as "Change channel", the communication channel of the conversation was changed during the course of the conversation. In another example, if a conversation in the first set of conversations has an associated predetermined tag as "Solved," the issue being discussed in the conversation has been solved.

A person having ordinary skill in the art will understand that the scope of disclosure should not be limited to the one or more predetermined tags corresponding to the status of the conversation. In an embodiment, the one or more predetermined tags may further correspond to sentiment of the conversation, a compliment being conveyed in the conversation, or acknowledgement. The following table illustrates other examples of the one or more predetermined tags:

TABLE 2

Other examples of the one or more predetermined tags

| One or more predetermined tags | Description |
| --- | --- |
| Complaint | When a customer complains |
| Apology | When an agent apologizes |
| Answer | When someone answers a request |
| Receipt | When someone acknowledges receipt |
| Compliment | When someone sends a compliment |
| Response to positivity | When someone acknowledges a previous positive message |
| Request | When someone requests information |
| Greeting | Greetings |
| Thank | When someone expresses thankfulness |
| Announcement | When a customer announces an information |
| Solved | When a message clearly states that a problem is solved |
| Other | Any other message |

At step 304, the second set of conversations of the target domain may be received. In an embodiment, the processor 202 may receive the second set of conversations of the target domain from the database server 108. In an embodiment, the processor 202 may transmit a query to the database server 108 to retrieve the second set of conversations. In response to the query, the processor 202 may receive the second set of conversations. In an embodiment, the conversations in the second set of conversations do not have associated predetermined tags.

A person having ordinary skill in the art will understand that the first set of conversations and the second set of conversations may correspond to an audio conversation or a textual conversation. In an embodiment, an audio conversation between the user-computing device 102 and the agent-computing device 106 may be realized using various communication protocols such as VOIP, PSTN, and mobile communication protocols. In another embodiment, the first set of conversations and the second set of conversations may correspond to textual conversations. In an embodiment, the agent and the user may have the textual conversation using one or more communication mediums, such as email, SMS, chat servers, etc.

At step 306, a transcript for each conversation in the first set of conversations and the second set of conversations is generated. In an embodiment, the processor 202 may be configured to generate the transcript. If the first set of conversations and the second set of conversations correspond to an audio conversation, the processor 202 may perform speech-to-text conversion to generate the transcript. In an embodiment, the transcript may correspond to a text version of the audio conversation between the agent and the user.

In another embodiment, where the first set of conversations and the second set of conversations correspond to textual conversation, the processor 202 may collate the communication between the agent and the user to generate a transcript. For example, if the user sends an email to the agent on Monday at 3:00 PM and the agent replies to the email on Tuesday at 11:00 AM, the processor 202 may collate such communications to generate a transcript.

At step 308, a first weight is assigned to each conversation in the first set of conversations based on a similarity of content in the first set of conversations and the second set of conversations. In an embodiment, the processor 202 may be configured to assign the first weight to each conversation in the first set of conversations.

To assign the first weight, the processor 202 may extract the one or more features from the transcript for the first set of conversations and the second set of conversations. As the transcript corresponds to a text version of the conversation between the agent and the user, the one or more features extracted from the transcript may correspond to unigram and bigram features. The processor 202 may assign a label to the one or more features based on whether the one or more features have been extracted from the transcript for the first set of conversations or from the transcript for the second set of conversations. In an embodiment, the processor 202 may assign the "+1" label to the feature if the feature is extracted from the transcript for a conversation in the first set of conversations. In an embodiment, the processor 202 may assign the "−1" label to the feature if the feature is extracted from the transcript for a conversation in the second set of conversations.

Based on the label assigned to the one or more features, the processor 202 may train a classifier that is capable of determining whether a conversation belongs to a source domain (i.e., first set of conversations) or the target domain (i.e., second set of conversations). Based on the classifier, the processor 202 may determine a ratio of a probability of a conversation belonging to the target domain and a probability of a conversation belonging to the source domain:

$$\frac{P_t(x \mid d = \text{target})}{P_s(x \mid d = \text{source})} \quad (1)$$

where, $P_t(x|d=\text{target})$: Probability that a conversation x corresponds to a target domain;

$P_s(x|d=\text{source})$: Probability that a conversation x corresponds to a source domain; and d: Random variable to represent whether the conversation corresponds to a target domain or a source domain.

In an embodiment, the ratio may correspond to the first weight assigned to the first set of conversations. If it is determined, based on the classifier, that a conversation from the first set of conversations may correspond to a target domain, based on equation 1, the processor 202 may assign higher weightage to the conversation compared with that assigned to other conversations in the first set of conversations. As the ratio in the equation 1 is determined based on the unigram and bigram features of the transcript, the ratio may be representative of a degree of similarity of content between the first set of conversations and the second set of conversations.

In an embodiment, based on the first weight assigned to the first set of conversations, the processor 202 may determine a model for the second set of conversations in the target domain. In an embodiment, the following equation represents the model for the second set of conversations in the target domain:

$$f_t^* = \mathrm{argmin}_{f \in H} \frac{1}{N_s} \sum_{i=1}^{N_s} \frac{P_t(x \mid d = \text{target})}{P_s(x \mid d = \text{source})} L(x_i^s, y_i^s, f) \qquad (2)$$

where, $N_s$: Count of conversations in the first set of conversations;

$L(x_i^s, y_i^s, f)$: Loss function;

$x_i^s$: $i^{th}$ conversation in the first set of conversations;

$y_i^s$: Predetermined tag assigned to the $i^{th}$ conversation in the first set of conversations; and $f$: corresponds to a function that returns prediction confidence i.e. confidence of assigning class label y to x.

At step 310, the one or more features are extracted from the transcript for each conversation in the first set of conversations. In an embodiment, the processor 202 may extract the one or more features. In an embodiment, the one or more features may be a count of n-gram words in a conversation, a position of a segment in a thread of a conversation, a position of a segment in a conversation, a sender of a conversation, an email of the sender, a count of letters in uppercase in a conversation, a count of punctuations in a conversation, a measure of positive sentiment, and a measure of a negative sentiment.

For example, a conversation in the first set of conversations may refer to a tweet "Complaint is forwarded to the email id of our customer care executive at cuscare@xyz.com. He will get in touch with you soon!". In such an instance, the one or more features may include "email," "positive sentiment," and "special punctuation." Similarly, the one or more features are extracted from each conversation in the first set of conversations.

In an embodiment, the processor 202 may determine the value of the one or more features of a conversation in the first set of conversations may be represented by the following equation:

$$E_{D_s}^k = \sum_{(x_l, y_l) \in D_s} \frac{f_k(x_l, y_l)}{N} \qquad (3)$$

where, $E_{D_s}^k$: Represents the value of feature k;

$x_l$: Message I in a conversation; and $y_l$: Label I assigned to message I in the conversation.

At step 312, the one or more features are extracted from the transcript for the second set of conversations. In an embodiment, the processor 202 may extract the one or more features from the transcript for the second set of conversations. Further, the processor 202 may determine the value of the one or more features associated with each conversation in the second set of conversations. In an embodiment, the processor 202 may utilize the following equation to determine the value of the one or more features associated with the second set of conversations:

$$E_{D_t}^k = \frac{1}{N'} \sum_{x_l \in D'} \sum_y f_k(x_l, y) Pr(y \mid x_l, w) \qquad (4)$$

where, $E_{D_t}^k$: Represents the value of feature k in target domain; and $Pr(y \mid x_l, w)$: Feature distribution in source domain.

In an embodiment, the value of the one or more features associated with the second set of conversations is assumed based on the distribution of the one or more features of the first set of conversations.

At step 314, a Euclidian distance between the value of the one or more features associated with the first set of conversations and the value of the one or more features associated with the second set of conversations, is determined. In an embodiment, the processor 202 may be configured to determine the Euclidian distance. In an embodiment, based on the Euclidian distance, the processor 202 may identify features that are similar in the first set of conversations and the second set of conversations.

At step 316, a second weight is assigned to the one or more features associated with the first set of conversations based on the determined Euclidian distance associated with each of the one or more features associated with the first set of conversations. In an embodiment, higher weightage is assigned to features that have small Euclidian distance compared with in comparison the weights assigned to features that have large Euclidian distance.

At step 318, a conversation classification model is trained. In an embodiment, the processor 202 may train the conversation classification model. In an embodiment, the conversation classification model is represented by the following equation:

$$L(w) = \mathrm{argmax}_w \Sigma_{(x,y) \in D^s}(\Sigma_k w_k f_k(x,y) - \log z_w(x)) - \lambda \Sigma_k w_k^2 (E_{D^s}^k - E_{D^t,w}^k)^2 \qquad (5)$$

where, $E_{D_t}^k$: represents the expected value of textual feature k in target domain;

$E_{D_s}^k$: represents the expected value of textual feature k in source domain;

$w_k$: represents the weights proportional to the distance between the training and target distribution along the $k^{th}$ feature component;

$z_w(x)$: is the normalization term; and $\lambda$: is the scaling parameter for the constraints i.e. the square distance $(E_{D^s}^k - E_{D^t,w}^k)^2$.

In an embodiment, the processor 202 may optimize the conversation classification model based on the first weight and the second weights assigned to the first set of conversations and the one or more features, respectively. As the weights assigned to each conversation in the first set of conversations and the weight assigned to the one or more features have been modified in accordance to similarity between the first set of conversations of the source domain and the second set of conversations of the target domain. Therefore, the conversation classification model so trained may be able to assign the one or more predetermined tags to the conversation from the target domain along with the assigning the predetermined tags to conversations from the source domain.

A person having ordinary skills in the art will understand that the scope of disclosure is not limited to training the conversation classification model based on the target domain and the source domain only. In an embodiment, the conversation classification model may be trained in such a manner that it is capable of assigning the predetermined tags to conversations from more than two domains.

In an embodiment, the trained conversation-classifying model may retrieve an ongoing conversation between the agent and the user. In an embodiment, the ongoing conversation does not have the assigned predetermined tag. The processor 202 may generate the transcript of the ongoing conversation based on the speech to text technique. Thereafter, the processor 202 may determine the one or more features from the transcript.

In an embodiment, the processor 202 may utilize the conversation-classifying model to assign a predetermined tag to the ongoing conversation based on the one or more features. As the conversation-classifying model is independent of the domain, the predetermined tag is assigned to the ongoing conversation irrespective of the domain of the conversation.

In an embodiment, as discussed in conjunction with Table 1 and Table 2, the predetermined tag may correspond to the status of the conversation, sentiment of the conversation, a compliment being conveyed in the conversation, or acknowledgement. Based on the predetermined tag assigned to the ongoing conversation, the processor 202 may perform a predetermined operation. For example, if the predetermined tag assigned to the ongoing conversation is "solved", the processor 202 may close the request raised by the user. If the predetermined tag assigned to the conversation is "change channel", the processor 202 may send a notification to the agent computing device 106 informing him/her about the possibility that the user may initiate change of channel. In an embodiment, the processor 202 may utilize one or more rules to perform the predetermined operation. In an embodiment, the predetermined rules may comprise the details of the computing device to which the notification pertaining to the ongoing conversation is to be sent by the processor 202.

The disclosed embodiments encompass numerous advantages. Through various embodiments for training a conversation classification model, it is disclosed that the conversations of a target domain may be classified using already classified conversations of a source domain. In such a case, the trained conversation classification model does not require any training data of the target domain, hence reduces cost of generation of training data of the target domain. Therefore, the disclosed embodiments allows a classification model to use previously learned knowledge of one domain and adapt it to the new test domain with no labeled data from test domain.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++', Java, and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems to train a classification model for classifying conversations have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for training a conversation classification model, the method comprising:
receiving, by a transceiver, a first set of conversations corresponding to a source domain and a second set of conversations corresponding to a target domain,
wherein each conversation in the first set of conversations has one or more predetermined tags,
wherein at least one of the one or more predetermined tags corresponds to a status of the first set of conversations,
wherein the source domain corresponds to a first technical or business field for which the one or more predetermined tags are associated and the target domain correspond to a second technical or business field, different from the first technical or business field, for which tags are not associated, and
wherein each conversation in the first set of conversations and each conversation in the second set of conversations comprises an audio conversation;
generating, by one or more processors, a transcript for each conversation in the first set of conversations and a transcript for each conversation in the second set of conversations based on a speech-to-text conversion technique;
extracting, by the one or more processors, one or more features from the transcript of each of the first set of conversations and the second set of conversations;
assigning, by the one or more processors, a first weight to each conversation in the first set of conversations based on at least a similarity between content of the first set of conversations and content of the second set of conversations, wherein the similarity of the content is determined based on the one or more features extracted from the transcripts of the first set of conversations and the second set of conversations, and based on a ratio defined as:

$$\sum_{i=1} \left( \frac{P_i(x \mid d = \text{target})}{P_i(x \mid d = \text{source})} \right)$$

where:
$P_i(x \mid d=\text{target})$ corresponds to a probability that a conversation x corresponds to a target domain, and
$P_i(x \mid d=\text{source})$ corresponds to a probability that a conversation x corresponds to a source domain,
wherein a Euclidian distance is determined between the value of the one or more features extracted from the transcript of the first set of conversations and the value of the one or more features extracted from the transcript of the second set of conversations, and
wherein a similarity is identified between the one or more features extracted from the transcript of the first set of conversations and the one or more features extracted from the transcript of the second set of conversations, based on the determined Euclidian distance;
assigning, by the one or more processors, a second weight to each of the one or more features associated with the first set of conversations based on a similarity between the one or more features extracted from the transcript of the first set of conversations and the one or more features extracted from the transcript of the second set of conversations;
training, by the one or more processors, the conversation classification model based on at least the first weight and the second weight, wherein the conversation classification model is capable of assigning the one or more predetermined tags to the second set of conversations;
applying new conversations in the second set of conversations corresponding to the target domain to the conversation classification model; and
assigning, automatically, the at least one of the one or more predetermined tags to the new conversations based on a result of the application of the new conversations to the conversation classification model.

2. The method of claim 1, wherein the first set of conversations and the second set of conversations comprises text conversations.

3. The method of claim 1, further comprising identifying, by the one or more processors, one or more conversations from the first set of conversations based on the determined similarity between the first set of conversations and the second set of conversations, wherein a value of the first weight assigned to the one or more conversations is higher in comparison to the first weight assigned to other conversations in the first set of conversations.

4. The method of claim 1, wherein the one or more features comprise at least a count of n-gram words in a conversation, a position of a segment in a thread, a position of a segment in a message, a sender of a message, an email of said sender, a count of letters in uppercase, a count of punctuations in the conversation, a measure of positive sentiment, and a measure of a negative sentiment.

5. The method of claim 1, wherein the second weight is assigned to the one or more features such that a feature of the first set of conversations similar to a feature of the second set of conversations is assigned a higher value in comparison to other features in the one or more features of the first set of conversations.

6. The method of claim 1, wherein the at least one of the one or more predetermined tags corresponds to at least one of an open category, a solved category, a closed category or a change channel category.

7. The method of claim 1, wherein each conversation of the second set of conversations of the target domain is not assigned the one or more predetermined tags.

8. The method of claim 1, further comprising transmitting, by the one or more processors, a notification to a first user in the conversation, through a user-computing device, based on the at least one of the one or more predetermined tags to the new conversations in the second set of conversations, wherein the notification corresponds to a recommendation of an action to be performed by the first user.

9. A system for training a conversation classification model, said system comprising:

a transceiver configured to:
receive a first set of conversations corresponding to a source domain and a second set of conversations corresponding to a target domain,
wherein each conversation in the first set of conversations has one or more predetermined tags,
wherein at least one of the one or more predetermined tags corresponds to a status of the first set of conversations,
wherein the source domain corresponds to a first technical or business field for which the one or more predetermined tags are associated and the target domain correspond to a second technical or business field, different from the first technical or business field, for which tags are not associated, and
wherein each conversation in the first set of conversations and each conversation in the second set of conversations comprises an audio conversation; and
one or more processors configured to:
generate a transcript for each conversation in the first set of conversations and the second set of conversations based on a speech-to-text conversion technique;
extract one or more features from the transcript of the first set of conversations and from the transcript of the second set of conversations,
assign a first weight to each conversation in the first set of conversations based on at least a similarity between content of the first set of conversations and content of the second set of conversations, wherein the similarity of the content is determined based on the one or more features extracted from the transcript of the first set of conversations and from the transcript of the second set of conversations, and based on a ratio defined as:

$$\sum_{i=1}\left(\frac{P_i(x\mid d=\text{target})}{P_i(x\mid d=\text{source})}\right)$$

where:
$P_i(x\mid d=\text{target})$ corresponds to a probability that a conversation x corresponds to a target domain, and
$P_i(x\mid d=\text{source})$ corresponds to a probability that a conversation x corresponds to a source domain,
wherein a Euclidian distance is determined between the value of the one or more features extracted from the transcript of the first set of conversations and the value of the one or more features extracted from the transcript of the second set of conversations, and
wherein a similarity is identified between the one or more features extracted from the transcript of the first set of conversations and the one or more features extracted from the transcript of the second set of conversations, based on the determined Euclidian distance;
assign a second weight to each of the one or more features associated the first set of conversations based on a similarity between the one or more features extracted from the transcript of the first set of conversations and the one or more features extracted from the transcript of the second set of conversations, train the conversation classification model based on at least the first weight and the second weight, wherein the conversation classification model is capable of assigning the one or more predetermined tags to the second set of conversations;
apply new conversations in the second set of conversations corresponding to the target domain to the conversation classification model; and
assign, automatically, the at least one of the one or more predetermined tags to the new conversations based on a result of the application of the new conversations to the conversation classification model.

10. The system of claim 9, wherein the first set of conversations and the second set of conversations comprises text conversations.

11. The system of claim 10, wherein the one or more processors are further configured to:
identify one or more conversations from the first set of conversations based on the determined similarity between the first set of conversations and the second set of conversations, wherein a value of the first weight assigned to the one or more conversations is higher in comparison to the first weight assigned to other conversations in the first set of conversations.

12. The system of claim 9, wherein the one or more features comprise at least a count of n-gram words in a conversation, a position of a segment in a thread, a position of a segment in a message, a sender of a message, an email of the sender, a count of letters in uppercase, a count of punctuations in the conversation, a measure of positive sentiment, and a measure of negative sentiment.

13. The system of claim 9, wherein the second weight is assigned to the one or more features such that a feature of the first set of conversations similar to a feature of the second set of conversations is assigned a higher value in comparison to other features in the one or more features of the first set of conversations.

14. The system of claim 9, wherein the at least one of the one or more predetermined tags corresponds to at least one of an open category, a solved category, a closed category or a change channel category.

15. The system of claim 9, wherein each conversation of the second set of conversations of the target domain is not assigned the one or more predetermined tags.

16. A computer program product for use with a computing device, the computer program product comprising a non-transitory computer readable medium, the non-transitory computer readable medium storing a computer program code for training a conversation classification model, the computer program code being executable by one or more processors in the computing device to:
receive a first set of conversations corresponding to a source domain and a second set of conversations corresponding to a target domain,
wherein each conversation in the first set of conversations has one or more predetermined tags,
wherein at least one of the one or more predetermined tags corresponds to a status of the first set of conversations,
wherein the source domain corresponds to a first technical or business field for which the one or more predetermined tags are associated and the target domain correspond to a second technical or business field, different from the first technical or business field, for which tags are not associated, and wherein each conversation in the first set of conversations and each conversation in the second set of conversations comprises an audio conversation;

generate a transcript for each conversation in the first set of conversations and each conversation in the second set of conversations based on a speech-to-text conversion technique;

extract one or more features from the transcripts of each of the first set of conversations and the second set of conversations;

assign a first weight to each conversation in the first set of conversations based on at least a similarity between content of the first set of conversations and content of the second set of conversations, wherein the similarity of the content is determined based on the extracted one or more features of each of the first set of conversations and the second set of conversations, and based on a ratio defined as:

$$\sum_{i=1} \left( \frac{P_i(x \mid d = \text{target})}{P_i(x \mid d = \text{source})} \right)$$

where:
$P_i(x|d=\text{target})$ corresponds to a probability that a conversation x corresponds to a target domain, and
$P_i(x|d=\text{source})$ corresponds to a probability that a conversation x corresponds to a source domain, wherein a Euclidian distance is determined between the value of the one or more features extracted from the transcript of the first set of conversations and the value of the one or more features extracted from the transcript of the second set of conversations, and wherein a similarity is identified between the one or more features extracted from the transcript of the first set of conversations and the one or more features extracted from the transcript of the second set of conversations, based on the determined Euclidian distance;

assign a second weight to each of the one or more features associated the first set of conversations based on a similarity between the one or more features extracted from the transcript of the second set of conversations;

train the conversation classification model based on at least the first weight and the second weight, wherein the conversation classification model is capable of assigning the one or more predetermined tags to the second set of conversations;

apply new conversations in the second set of conversations corresponding to the target domain to the conversation classification model; and assign, automatically, the at least one of the one or more predetermined tags to the new conversations based on a result of the application of the new conversations to the conversation classification model.

* * * * *